United States Patent
Laughton et al.

(10) Patent No.: US 10,810,146 B2
(45) Date of Patent: Oct. 20, 2020

(54) REGULATION FOR ATOMIC DATA ACCESS REQUESTS

(71) Applicant: Arm Limited, Cambridge (GB)

(72) Inventors: Arthur Brian Laughton, Hathersage (GB); Chiranjeev Acharya, Sheffield (GB); Eduard Vardanyan, Sheffield (GB)

(73) Assignee: ARM LIMITED, Cambridge (GB)

( * ) Notice: Subject to any disclaimer, the term of this patent is extended or adjusted under 35 U.S.C. 154(b) by 26 days.

(21) Appl. No.: 16/200,205

(22) Filed: Nov. 26, 2018

(65) Prior Publication Data
US 2019/0179783 A1   Jun. 13, 2019

(30) Foreign Application Priority Data

Dec. 12, 2017   (GB) .................................. 1720664.0

(51) Int. Cl.
| | | |
|---|---|---|
| *G06F 13/20* | (2006.01) | |
| *G06F 13/40* | (2006.01) | |
| *G06F 13/362* | (2006.01) | |
| *G06F 30/30* | (2020.01) | |
| *G06F 111/20* | (2020.01) | |

(52) U.S. Cl.
CPC ............ *G06F 13/20* (2013.01); *G06F 13/362* (2013.01); *G06F 13/4022* (2013.01); *G06F 13/4027* (2013.01); *G06F 30/30* (2020.01); *G06F 2111/20* (2020.01)

(58) Field of Classification Search
None
See application file for complete search history.

(56) References Cited

U.S. PATENT DOCUMENTS

| | | | | |
|---|---|---|---|---|
| 6,732,208 B1* | 5/2004 | Alsaadi | ............... | G06F 12/0831 710/107 |
| 9,690,737 B2* | 6/2017 | Tucek | ................. | G06F 12/0831 |
| 2009/0292885 A1* | 11/2009 | Molgaard | ........... | G06F 13/1631 711/152 |
| 2014/0181349 A1* | 6/2014 | Balkan | ................ | G06F 13/4027 710/310 |
| 2016/0043965 A1* | 2/2016 | Goldenberg | .......... | H04L 47/801 709/225 |

OTHER PUBLICATIONS

Search Report for GB1720664.0 dated Jun. 12, 2018, 5 pages.

* cited by examiner

*Primary Examiner* — Elias Mamo
(74) *Attorney, Agent, or Firm* — Nixon & Vanderhye PC

(57) ABSTRACT

Routing circuitry 400 is provided for routing transaction requests to a selected destination node. The routing circuitry supports read requests requiring a read response, write requests requiring a write response and at least one type of atomic data access request requiring both a read response and a write response. Request regulators 401, 402, 403 are provided to monitor resource usage for read, atomic and write requests, and issue circuitry 431 controls the issuing of a transaction request received from a requesting node, in dependence on resource usage monitoring performed by the request regulators. The issue circuitry controls the issuing of atomic requests in dependence on the resource usage monitored by the write request regulator and the resource usage monitored by the atomic request regulator.

20 Claims, 9 Drawing Sheets

| request type | Requesting node specifies: | Destination node provides response: |
|---|---|---|
| Read | target address | Read response providing data read from addressed location |
| Write | target address, Wdata | Write response confirming servicing of write operation to write Wdata to addressed location |
| Atomic Store | target address, Wdata | Write response confirming servicing of write operation to write fn (Wdata, data read from addressed location) to addressed location |
| Atomic Load | target address, Wdata | Write response confirming servicing of write operation to write fn (Wdata, data read from addressed location) to addressed location<br>Read response providing old/new data of addressed location |
| Atomic Swap | target address, Wdata | Write response confirming servicing of write operation to write Wdata to addressed location<br>Read response providing old data read from addressed location |
| Atomic Compare | target address, Cdata, Sdata | Write response confirming servicing of conditional write (conditional on comparison between Cdata and data read from addressed location) of Sdata to addressed location<br>Read response providing old/new data of addressed location or indication of comparison result | atomic data access requests requiring both read write response

FIG. 3

REGULATION FOR ATOMIC DATA ACCESS REQUESTS

This application claims priority to GB Patent Application No. 1720664.0 filed Dec. 12, 2017, the entire contents of which are hereby incorporated by reference.

BACKGROUND

Technical Field

The present technique relates to the field of data processing. More particularly it relates to the regulation of data access requests.

Technical Background

An integrated circuit may include a number of components which may communicate by issuing data access requests specifying a target memory address. Routing circuitry may be provided which manages routing of a data access request from a given requesting node of the integrated circuit to an appropriate destination node depending on the target address specified by the data access request.

SUMMARY

At least some examples provide an apparatus comprising: routing circuitry to route transaction requests from a requesting node to a destination node; issue circuitry to control issuing of a transaction request received from the requesting node to the destination node in dependence on resource usage monitoring performed by a plurality of request regulators; the plurality of request regulators comprising: a read request regulator to monitor resource usage by read requests requiring a read response; a write request regulator to monitor resource usage by write requests requiring a write response; and an atomic request regulator to monitor resource usage by at least one type of atomic request requiring both the write response and the read response.

At least some examples provide a method comprising the steps of: routing transaction requests from a requesting node to a destination node; monitoring resource usage by read requests requiring a read response using a read request regulator; monitoring resource usage by write requests requiring a write response using a write request regulator; monitoring resource usage by at least one type of atomic request requiring both the write response and the read response using an atomic request regulator; and controlling issuing of transaction requests received from the requesting node to the destination node in dependence on resource usage monitoring performed by a plurality of request regulators including the read request regulator, the write request regulator and the atomic request regulator.

At least some examples provide an electronic design file providing a representation of the apparatus as discussed above. The electronic design file may be stored on a storage medium. The storage medium may be a non-transitory storage medium.

Further aspects, features and advantages of the present technique will be apparent from the following description of examples, which is to be read in conjunction with the accompanying drawings.

BRIEF DESCRIPTION OF THE DRAWINGS

FIG. 3 is a table showing an example of different types of data access transactions which may be handled by the interconnect;

DESCRIPTION OF EXAMPLES

Figure 1:
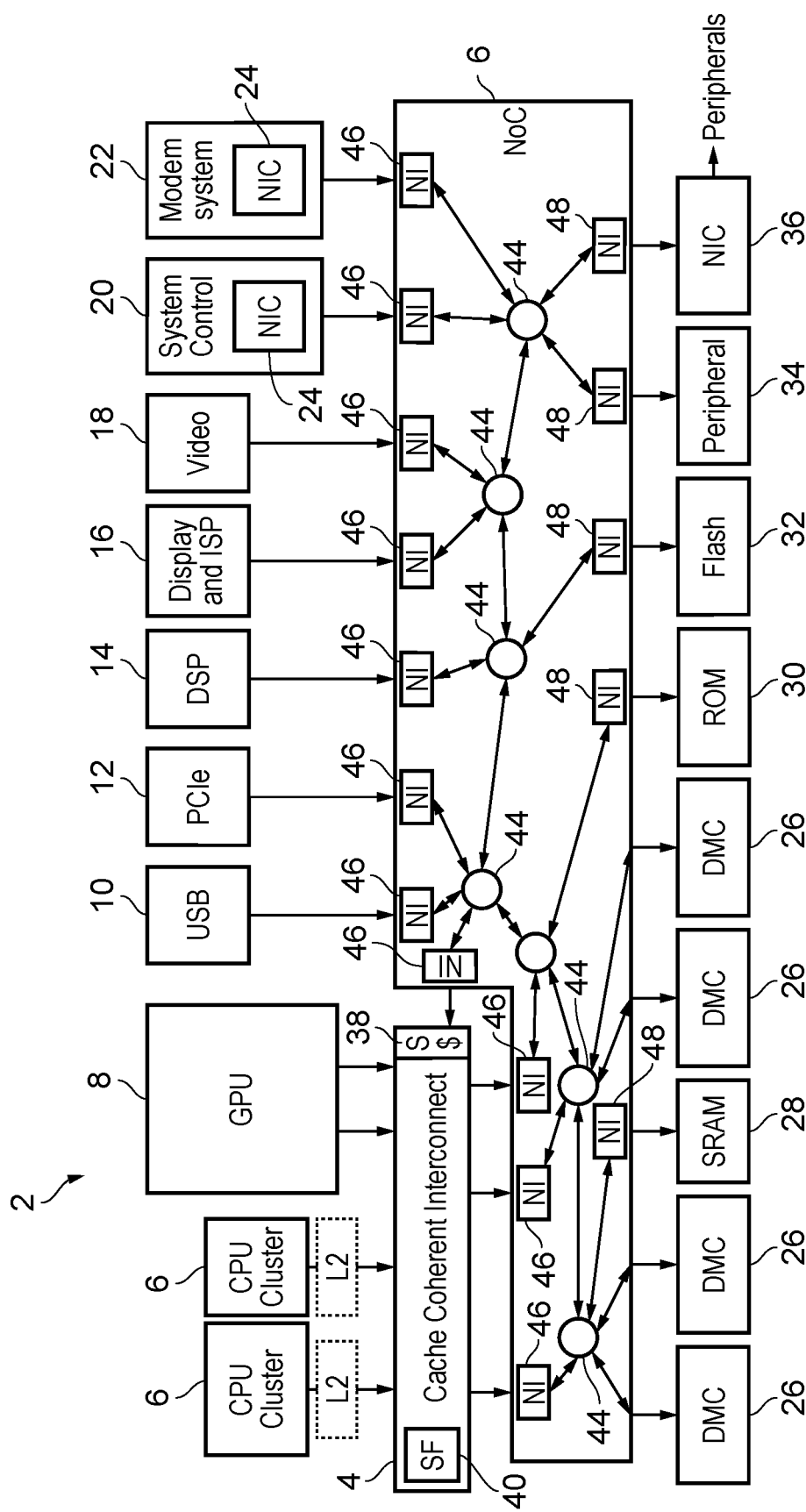
FIG. 1 schematically illustrates an example of a data processing system having a number of components which communicate via an interconnect or network on chip.

An apparatus, such as an integrated circuit or system on chip, may have routing circuitry to route transaction requests from a requesting node to a destination node. The apparatus may also include issue circuitry to control issuing of a transaction request received from the requesting node to the destination node in dependence on resource usage monitoring performed by a plurality of request regulators. The issue circuitry may issue signals for triggering a selected destination node selected from among a plurality of destination nodes to service a data access request. For example, the routing circuitry may comprise an interconnect or a network on chip. The plurality of request regulators for performing resource usage monitoring may comprise a read request regulator to monitor resource usage by read requests requiring a read response; a write request regulator to monitor resource usage by write requests requiring a write response; and an atomic request regulator to monitor resource usage by at least one type of atomic request requiring both the write response and the read response.

The routing circuitry may support a number of types of requests. When the data access request (transaction request) is a read request received from the requesting node over a read request channel, the data access routing circuitry may issue signals for triggering selected destination node to provide a read response which depends on data read from a target storage location identified by a target address. When the data access request is a write request received from the requesting node over a write request channel, the data access routing circuitry may issue signals for triggering a selected destination node to provide a write response confirming servicing of a write operation for writing data to the target storage location (indicated by the target storage address). When the data access request is an atomic request, the routing circuitry may issue signals for triggering a selected destination node to provide both a write response and a read response.

Read and write request regulators monitor resource usage by read and write requests respectively. Issue circuitry controls issuing of transactions based on the resource usage. The resource usage monitored could for example include allocation of space in one or more buffers for buffering transactions, responses to transactions, or information about transactions, or could be credits permitting transactions to issue and consume downstream resource.

A third (atomic) regulator is provided in addition to the read regulator and the write regulator. Atomic requests differ from both read requests and write requests in that an atomic request may require the issue circuitry to issue signals for triggering the selected destination node to provide both a read response and a write response. Hence, unlike read requests and write requests which only return one of the read response and the write response respectively, the at least one type of atomic request may return both a read response and a write response. This can be useful, for example, for operations which require a value to be read from a target storage location at a destination node and also require simple logical or arithmetic operations to be applied to a read value and then require a value to be written to the target storage location in dependence on the result of that operation. Without support for atomic requests it would be required to issue a read request to read the data value to the requesting node, and for the requesting node to perform the required operation on the read value before issuing a separate write request to write result back to the target storage location. If the destination node can support processing of such transactions directly then this can reduce the length of time between the read and write making it simpler to ensure that the read and write are observed atomically by other nodes of the circuit, and hence reducing the complexity and managing conflicting access to a shared resource at a destination node by different requesting nodes.

However, the atomic requests may require both read resources and write resources to be allocated to the request by the routing circuitry. Accordingly, without adding an atomic regulator to handle atomic requests, the additional load on the read response channel caused by the atomic requests may not be accounted for by the read regulator and this could cause the read channel to be oversubscribed. This could, for example, lead to the starvation of read traffic, as atomic requests could have already taken resource expected by the read regulator to be available for read requests. By providing a separate atomic regulator whose resource usage monitoring for atomic requests influences the issuing of transaction requests by the issue circuitry, the read and write resource usage by atomic requests can be accounted for better than if the read and write regulators alone were used, allowing for more efficient use of available resource and more careful quality of service control.

In order to manage the allocation of read resources between both read requests and atomics the issue circuitry may be configured to control issuing of the at least one type of atomic request in dependence on both the resource usage monitored by the write request regulator and the resource usage monitored by the atomic request regulator. This allows the issuing of atomic requests to be controlled based on the write regulator as well as the atomic regulator so that they do not oversubscribe the write resource. For example by tracking resource usage by atomic requests and also tracking the resource usage by write requests, the issue of atomic requests can be restricted below the rate that could prevent new write requests from being issued, taking into account the writes and atomics that have already issued.

In some examples the read request regulator comprises at least one read configuration element defining at least one read resource restriction restricting resource usage by read requests. This read configuration element may be configured by a user (e.g. by software) prior to use of the routing circuitry and may, for example, specify a value to indicate a maximum read resource allocation for read requests. The read configuration element may be configured by a user based on a user configuration operation to set the configuration element to indicate a maximum read resource allocation, or other control parameter which restricts resource usage, for the read resource.

In some examples the write request regulator comprises at least one write configuration element defining at least one write resource restriction restricting resource usage by write requests. This write configuration element may be configured by a user (e.g. by software) prior to use of the routing circuitry and may specify a value to indicate a maximum write resource allocation for write requests. The write configuration element may be configured by a user based on a user configuration operation to set the configuration element to indicate a maximum write resource allocation, or other control parameter which restricts resource usage, for the write resource.

In some examples the atomic request regulator comprises at least one atomic configuration element defining at least one write resource restriction restricting resource usage by atomic requests. This atomic configuration element may be configured by a user (e.g. in software) prior to use of the routing circuitry and may specify a value to indicate a maximum write resource allocation for atomic requests. The atomic configuration element may be configured by a user based on a user configuration operation to set the configuration element to indicate a maximum write resource allocation, or other control parameter which restricts resource usage, for the atomic resource.

In some examples, the atomic configuration element is separate from a write configuration element of the write request regulator for defining at least one resource restriction restricting resource usage by write requests. Accordingly, a user is able to set the atomic configuration element and the write configuration element independently in order to allocate a portion of the corresponding write resource so as to prevent the write resource from being exhausted by write requests only and maintain the capacity for atomic requests to be issued in addition to the write requests.

The routing circuitry may comprise at least one shared resource for handling read responses which is shared for use by both read requests and the at least one type of atomic request. This means that when one of the read or atomic requests is received in low volume the other type of request can make use of the shared resource. This can lead to more efficient resource usage and reduce the overall amount of resource required.

The data access routing circuitry may have read channel control circuitry for managing allocation of read resources for data access requests received on the read request channel, and write channel control circuitry to manage allocation of resources for data access requests received on the write request channel. Hence, by providing separate control circuits for the read and write request channels this can enable more efficient processing of the read and write request respectively which may have different resource requirements. In some cases, the read and write channels may receive the requests over physically separate signal paths. Alternatively, the requests could be received from the requesting node over a common bus but separated on receipt and managed separately within a data access routing circuitry. It can be useful to share the write request channel between write requests and atomic requests, because both write requests and atomic requests may provide data from the requesting node to be forwarded to the destination node. When the atomic requests are received on the write channel, the read request regulator monitoring the read channel would typically be unaware of the atomic requests being received and so monitoring of the read channel alone may be insufficient to prevent oversubscription of the read resources as some atomic requests not accounted for by the read regulator may consume read resource. Hence, providing an additional atomic request regulator can help to manage usage of read resource more efficiently.

In some examples, the routing circuitry is configured to determine which read responses or write responses are associated with each transaction request depending on a transaction identifier specified by each transaction request and a corresponding transaction identifier specified by each read response or write response. For example, a transaction request may be supplied to a regulator along with a transaction request identifier. The transaction request identifier may then be provided with the request to the destination node and the corresponding response may be sent from the destination node back to the regulator by identifying the transaction identifier originally sent with the request. This enables the regulator to determine which type of transaction request issued each request and accordingly allows the respective resources and to be kept up-to-date.

In some examples, the atomic request regulator and the read regulator may be configured to determine whether the given read response is associated with a read request or with the at least one type of atomic request. In addition, the atomic request regulator and the write regulator may be configured to determine whether a given write response is associated with a write request or with the at least one type of atomic request.

This may be performed in a number of ways. In some examples, the responses to atomic requests could be detected based on a tracker flag maintained by the data access routing circuitry in association with transaction identifiers of previously received atomic requests, to mark that on receipt of a read/write response with the transaction identifier that has been tagged with the tracker flag, it should be regarded as a read response to an atomic request and not a read response to a read request. Another approach can be to include trace or type fields in the transaction response to distinguish responses to the at least one type of atomic request from responses to read or write requests.

Another approach can be to determine whether the read response is associated with a read request or the at least one type of atomic request based upon the transaction identifier issued with the transaction request which is associated with a given read response. For example, this may be done based upon the transaction identifier associated with the given write response. Further, in some examples, a set of transaction identifiers may be reserved for atomic requests so that each of the regulators can recognise which write and read responses are responses to an atomic request. By using the transaction identifier to identify which responses relate to atomic requests, this avoids the need to provide an additional field in the responses themselves to distinguish read/write responses to an atomic request from responses to conventional read or write requests. This means that destination nodes designed for use with a protocol which did not support atomic requests (where the protocol already provides a transaction identifier field in the read/write responses but has no field capable of distinguishing responses to atomic requests) do not need to be modified to be compatible with the routing circuitry. This can improve compatibility with legacy devices.

In order to monitor the allocation of resources for read requests and write requests it may be advantageous to count a number of such requests issued by the routing circuitry, and count responses received to such requests, so as to track the number of outstanding requests. Therefore, in some examples the read request regulator comprises a read request counter. This read request counter may be used by the read request regulator to be incremented when a read request is received or issued by the issue circuitry, and to be decremented when a read response is identified by the read request regulator indicating that an issued read request has been serviced (i.e. when a read response corresponding to an issued read request is received). Accordingly, it is possible to maintain a read request counter to track the usage of the read resource by read requests. As mentioned above, read responses to issued read requests may be identified from the fact that the transaction identifier of the read response is not one of the identifiers reserved for atomic requests.

In some examples the write request regulator comprises a write request counter. This write request counter may be used by the write request regulator to be incremented when a write request is received or issued by the issue circuitry, and to be decremented when a write response is identified by the write request regulator indicating that an issued write request has been serviced (i.e. when a write response corresponding to an issued write request is received). Accordingly, it is possible to maintain a write request counter to track the usage of the write resource by write requests. Again, write responses to write requests may be identified when the transaction identifier of the write response is not one of the predetermined set of identifiers reserved for atomic requests.

In addition, in some examples the atomic request regulator may comprise an atomic request counter. The atomic request counter may be comprised within the atomic request regulator to indicate a number of atomic requests which have been issued for which the read or write response has not yet been received. The atomic request regulator may be configured to increment the atomic request counter when the at least one type of atomic request is received or issued by the issue circuitry, and to decrement the atomic request counter when the read response is received in response to an issued atomic request of the at least one type. Hence, the atomic request is considered outstanding from the time it is received or issued to the time its read response is received. Although some implementations could consider the atomic request outstanding until the later of the read response and write response is received, this can be more complex to implement as it would require tracking of the relative order in which the read/write responses for the atomic request are received, which would require matching of the specific responses received to particular requests that triggered them. In practice, tracking the atomic requests as outstanding until their read response is received is sufficient to manage the read and write resource appropriately since this is enough to address the problem of oversubscription of read resource due to the atomic requests on the write channel competing for read resource with read requests on the read channel. Although atomic requests also compete for write resource with write requests, this can be addressed by restricting issue of atomic requests based on both the write regulator and the atomic regulator, to avoid a regulator needing to track write responses to atomic requests explicitly. Hence, this approach improves the area and power efficiency of the system because a counter decrement on each read response for an atomic request can be enough to track completion of atomic requests by the atomic regulator, without needing additional circuitry to identify when the corresponding read and write responses relating to the same atomic request have both been received.

The at least one type of atomic request (atomic data access requests) may have a number of forms. Any given implementation may only support one of the types of atomic request, or could support multiple types. Hence, the at least one type of atomic request may comprise at least one of an atomic swap request, an atomic compare-and-swap request, and an atomic load request.

An atomic swap request is an atomic request specifying the target address and a further operand, for triggering the destination node to return the read response data read from the target storage location and to return the write response confirming servicing of an unconditional write operation for writing the further operand to the target storage location. An atomic compare-and-swap request may be an atomic request specifying the target address, a swap operand, and a compare operand, for triggering the destination node to return the read response dependent on the data read from the target storage location, and to return the write response confirming servicing on a conditional write operation for conditionally writing the swap operand and this target storage location, conditional on a comparison between the data read from the target storage location and the compare operand.

Further, an atomic load request is an atomic request which specifies the target address and an additional operand, for triggering the destination node to return the read response dependant on the data read from the target storage location, and to return the write response confirming servicing of a conditional or unconditional write operation to write a result value to the target storage location, the result value comprising result of an arithmetic or logical operation applied to the additional operand and the data read from the target storage location.

These types of atomic data access requests need not be the only types of atomic requests supported and further atomic requests which require both the read and the write response may also be provided.

Also, in some cases the system may also compare a further type of atomic data access requests which only requires a write response but does not require a read response. Such requests may be considered atomic because the write to the target storage location may be dependent on a value read from the target storage location so that it still requires both a read and a write to be performed atomically at the destination node. However, if it is not necessary for the requesting node to receive the value read from the target storage location then only a write response confirming servicing of the write operation may be required. For such atomic requests which do not require a read response, these can be handled in a similar way to write requests and so do not need any read resource to be allocated. Therefore, the reserved read resource may not be used for such further type of atomic request. Hence, it is not necessary to reserve resource for all types of atomic request.

FIG. 1 schematically illustrates an example of a data processing system 2 (e.g. an integrated circuit or system-on-chip) having data access routing circuitry 4, 6 for routing data access requests between requesting nodes and destination nodes and routing the responses to such data access requests from the destination nodes to the requesting nodes. In this example the system 2 includes a number of master devices, such as: one or more central processing units (CPUs) 6 or clusters of CPUs; a graphics processing unit (GPU) 8; a USB master 10 for controlling interaction with devices over a universal serial bus (USB); a PCIe controller 12 for controlling interaction with devices connected to the system 2 over a PCI Express bus; a digital signal processor (DSP) 14; a display controller and/or image signal processor 16; a video controller 18; a system controller 20, which could provide a number of system control functions such as controlling direct memory access operations, controlling security operations such as encryption or other on chip security operations, or controlling interaction with peripherals; and a modem system controller 22 for controlling communications via a modem. The system controller 20 and modem system controller 22 may have a network interface controller (NIC) 24. All of the masters 6 to 22 may be capable of acting as a requesting node for issuing data access requests to be serviced by a destination node of the system.

The system may have a number of components which may act as destination nodes, for example including a number of memory controllers 26 for controlling access to dynamic random access memory (DRAM); a memory controller 28 for controlling access to static random access memory (SRAM); a memory controller 30 for controlling access to a read only memory (ROM); a flash memory controller 32 for controlling access to flash memory; a peripheral controller 34 for controlling access to peripheral devices; and a network interface controller 36 for controlling interaction with remote devices or further peripherals via a network interface. Also the destination nodes may include a system cache 38 within the data routing circuitry 4, 6, which can cache some data from the memory system 26-36 so that some data access requests can be serviced without needing to pass them on to a downstream memory component.

In the example of FIG. 1, some of the masters 6, 8 are coupled via a cache coherent interconnect 4 which is responsible for managing coherency between cached data held by the respective master's caches. The cache coherent interconnect may have a snoop filter 40 for tracking data cached in particular masters' caches and may respond to read and write data access requests specifying a target address by issuing snoop transactions to check for the coherency status of data associated with the target address cached in other masters, so that if one master requests read or write access to data, then data for the same address in another master's cache can be invalidated, or if dirty, the latest value in that other master's cache can be provided to the requesting master and/or written back to the memory system. Any known coherency protocol could be used for the cache coherent interconnect 4.

The other masters 10 to 22 (which may not comprise a cache) do not need to be connected via the cache coherent interconnect 4. A system interconnect 6 couples the outputs of the cache coherent interconnect 4 and the non-cached masters 10 to 22 with the respective destination devices 26 to 36. The system interconnect 6 is used for routing of transactions to a target destination node selected based on the target address specified by the request, and for routing of the responses back to the requesting node. The system interconnect 6 does not need to take responsibility for management of coherency between cache data in respective masters.

In this example, the system interconnect 6 is implemented as a network on chip (NoC) which comprises a number of routers 44 for coupling a number of master interfaces 46 (from which data access requests can be received from respective master devices 6-22) to a number of destination interfaces 48 (for outputting the requests to respective destination devices 26-36). Each master interface 46 is responsible for decoding the address specified by the data access request to identify the particular route to be taken through the network on chip 6 via the routers 44 to reach a destination interface 48 associated with the selected destination node which is to service the data access request. In some cases the master interface 46 may also translate the protocol used for the request asserted to the network on chip 6 into an internal representation to be used for routing the request across the network on chip 6. If the requests are translated into an internal protocol, then the destination interfaces 48 may translate them back into the original protocol used by the request in order for servicing by the destination. Alternatively, some of the destination nodes may handle the request directly in the form used by the network on chip 6 so that no translation would be needed at the destination interface. For each destination interface 48, when it receives the response to a data access request from the destination node 26-36, the destination interface 48 issues that response back along the path taken by the corresponding request to the master interface 46 which issued the request, and the master interface 46 then returns the response to the requesting node.

A network on chip 6 as shown in FIG. 1 can be useful when there are a large number of master and destination devices to be connected, as the arrangement of routers 44 can be designed bespoke for the requirements of a given system in order to provide for an appropriate level of bandwidth and to provide sufficient number of routers that the physical distance over which requests have to be routed on the chip can be accommodated without significant loss of signal amplitude. For pairs of requesting and destination nodes which are expected to require a large amount of traffic then additional routers or signal channels can be provided between them, while other pairs of requesting/destination nodes may have less capacity.

The use of a network on chip is not essential and in other examples a different topology could be used within the system interconnect 6. For example, a series of point to point connections between the master and destination interfaces could be used, or a ring topology may be used in which all requests are asserted onto a ring bus and then circulate round until they reach the required target interface. Also, a mesh topology could be used where each interface 46, 48 is connected to a point on a grid and requests and responses may traverse between the points on the grid associated with the corresponding master and destination interfaces 46, 48. However, use of a network on chip can enable better scaling as the number of master and destinations increases.

Figure 2:
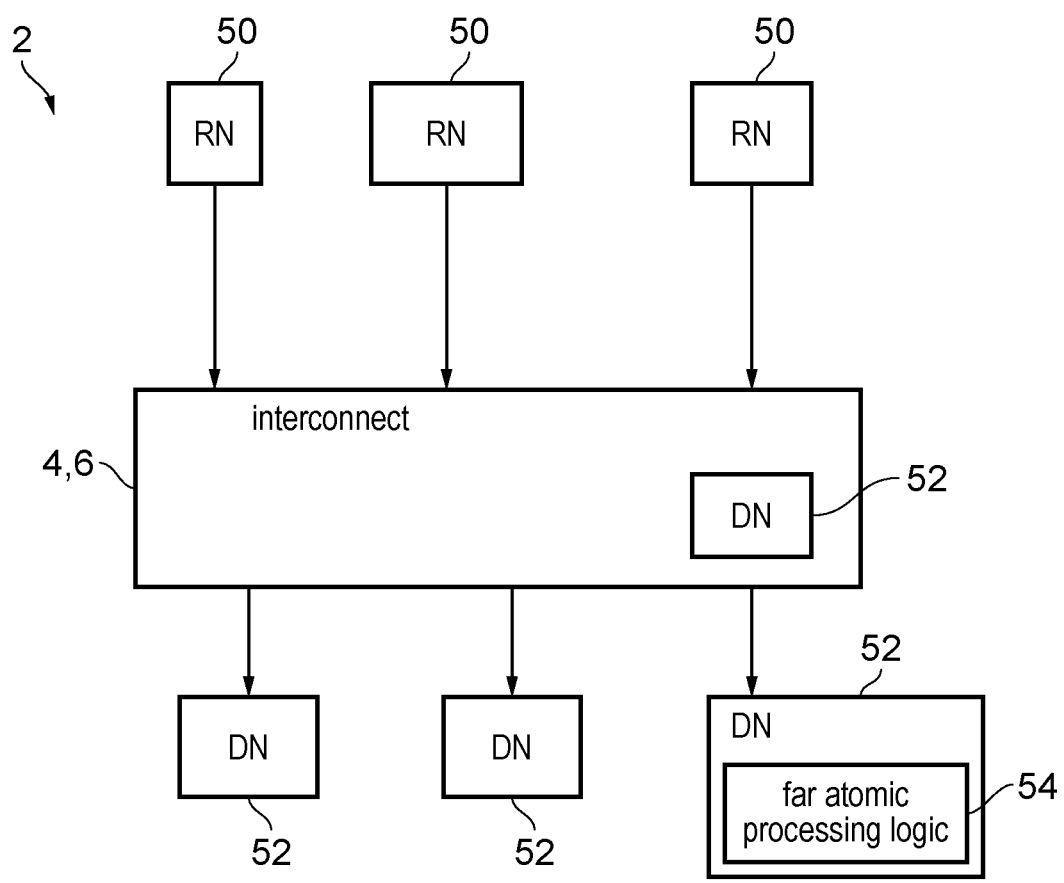
FIG. 2 shows an example of a destination node having far atomic processing logic for processing atomic data access requests requiring both a write response and a read response.

FIG. 2 shows a diagram illustrating use of an interconnect 4, 6 within an integrated circuit 2 or system on chip. In general the interconnect may receive requests from a number of requesting nodes 50, which could be any of the masters 6 to 22 shown in FIG. 1. The interconnect acts as data access routing circuitry to control routing of the requests to a destination node 52, which could be a system cache 38 within the interconnect or one of the downstream destinations 26 to 36 described in FIG. 1. The address specified by the request is used to select which destination is to service the request. When the request has been serviced by the destination node, a response is returned by the destination node 52 and the response is provided back to the requesting node 50.

As shown in FIG. 2, at least one of the destination nodes may comprise far atomic processing logic 54 which can perform an atomic operation in response to an atomic data access request triggered by one of the requesting nodes. The atomic operation may include both a read and a write and may involve an arithmetic or a logical operation being applied to the value read by the destination node in order to determine which value should be written back to the target storage location.

FIG. 3 shows a table summarising a number of types of data access requests which may be supported by the interconnect 4, 6 the request types include the following:

Read request. The requesting node (RN) 50 issues a read request specifying a target address, and in response the destination node (DN) 52 returns a read response providing data read from a target storage location (the "addressed location") identified by the target address.

Write request. The RN 50 issues a write request specifying a target address and write data (Wdata) in response, the DN 52 returns a write response confirming servicing of a write operation to write Wdata to the addressed location.

Atomic store. The RN 50 issues an atomic store request specifying a target address and the Wdata. In response, the DN 52 returns a write response confirming servicing of a write operation to write, to the addressed location, a result of a certain processing function applied to the Wdata and the data read from the addressed location. The function applied to the read data and the Wdata could, for example, be an arithmetic operation such as an add or subtract operation, or a logical operation such as logical AND, logical OR, or logical XOR. Also the function could be a comparison function, such as returning the maximum or minimum of the Wdata and the read data. In some cases the write operation could be a conditional operation, since if the function is the maximum or minimum function and the data read from the addressed location turns out to be the maximum or minimum value already, then it may not be necessary to write any value to the addressed location as the old value already has the correct value. Hence, there may be a number of forms of atomic store operation provided, each corresponding to a different function applied to the write data and the read data, in order to determine what value should be stored in the addressed location.

Atomic load. The RN 50 issues an atomic load request specifying a target address and the Wdata. In response the DN 52 returns a write response confirming servicing of a write operation to write, to the addressed location, a result of a function of the Wdata and the data read from the addressed location. The function may be any of the types of functions discussed above for atomic store. Also, the DN 52 returns a read response which provides either the old data read from the addressed location or the new data which resulted from the write. Hence, the atomic load request is handled in the same way as an atomic store, except that also the old or new data of the addressed location is returned to the RN 50 in a read response.

Atomic swap. The RN 50 issues an atomic swap request specifying the target address and the Wdata. In response the DN 52 performs an unconditional write operation to write Wdata to the addressed location and returns a write response confirming that the write operation has been serviced. Also, the DN 52 returns a read response providing the old data which was read from the addressed location (i.e. the data which was stored in the addressed location prior to performing the write).

Atomic compare. The RN 50 issues an atomic compare request specifying the target address, a compare data value (Cdata) and a swap data value (Sdata). The Cdata and Sdata can both be encoded on the write data channel which would be used for conveying the Wdata for the write request or one of the other forms of atomic request. In response to the atomic compare request, the DN 52 returns a write response confirming servicing of a conditional write of the Sdata to the addressed location. The conditional write is conditional on a comparison between the Cdata and the data read from the addressed location. For example, the Sdata could be written to the addressed location on condition that the data read from the addressed location is equal to the Cdata, is not equal to the Cdata, or is greater than or less than the Cdata, as desired. Some implementations may support the far atomic processing logic 54 implementing different forms of comparison while other systems may only provide for a certain default comparison such as the equals comparison. In addition to the write response, the DN 52 also provides a read response which provides either the old data of the addressed location before the write, the new data which is in the addressed location following the write, or some indication of the comparison result, such as whether the comparison criterion was passed or failed.

Hence, in general read requests trigger the DN 52 to provide a read response which depends on data read from the addressed location. Write requests or atomic store request return a write response which confirms servicing of the write operation to write data to the addressed location. The atomic load, atomic swap and atomic compare requests are forms of atomic data access request which require both the read response and a write response. Note that returning of the write response does not imply that the actual writing of the data to a certain storage location in memory has already taken place. In some cases the write response may be returned when the data access request has been serviced and made sufficient progress that it is guaranteed that the request will be carried out and will not be reordered relative to subsequently received requests, but may not imply that the data has already been written. For example, in some cases a write response could be returned by memory controller once information associated with the write request or atomic request has been written into a buffer from which the memory then takes the values and writes them to the memory and so sometimes the write response could be returned before the actual write of the final memory location has taken place. In general the write response may be sufficient for the requesting node to have confidence that the write is guaranteed to take place and any subsequent requests will take account of the effects of the write.

Not all destination nodes 52 need to support the atomic requests. Some destination nodes which do not have the far atomic processing logic 54 could only support the read and write request. However, the use of atomics can be useful for improving performance in scenarios where a number of requesting nodes need to access shared data in memory. If the atomic requests were not supported, then if one master needs to perform both a read and a write to a certain storage location without any other master intervening between the read and the write, it would have to issue a read request to read the data value from the destination node and return it into the master's own cache or processing logic and then perform the required operation on that read value locally at the requesting node 50. For example, the requesting node could calculate the function of the write data and the data read from the addressed location as required by the atomic store or atomic load request or could perform the comparison as performed by the atomic compare request. Having determined what value then needs to be written back to memory the requesting node 50 could then issue a write request which controls the destination node to update the addressed location with that data. With this approach there is a long delay between the issuing of the read request to read the data from the addressed location and the write response being received in response to the subsequent write to update that location, and during this time other requesting nodes may be blocked from accessing that address (e.g. using a lock-based mechanism where a lock variable is used to control exclusive access to certain addresses by a particular master). This can be harmful for performance because those other masters may have to stall their operations until the lock is released and they can then interact with the shared resource. This can be a particular problem for cases where a number of masters (or a number of processes executing in software on the same master) each need to update some variable, such as a counter counting a number of events of a certain type, and it is important to ensure that any updates to that variable are performed atomically to avoid certain updates being missed if one master reads a value of the variable between the read and write requests issued by another master or another software process.

These issues can be reduced by using the atomic requests because they allow the destination node itself to perform both the read and the write required for implementing such operations and this greatly reduces the time between the read and the write and also simplifies management of the atomic nature of the operation because it need not rely on setting of lock variables in order to prevent other processes accessing the address between the read and the write, since the destination node itself may handle atomic requests as a single operation and not allow other read or write requests to be handled partway through the atomic operation.

Figure 4:
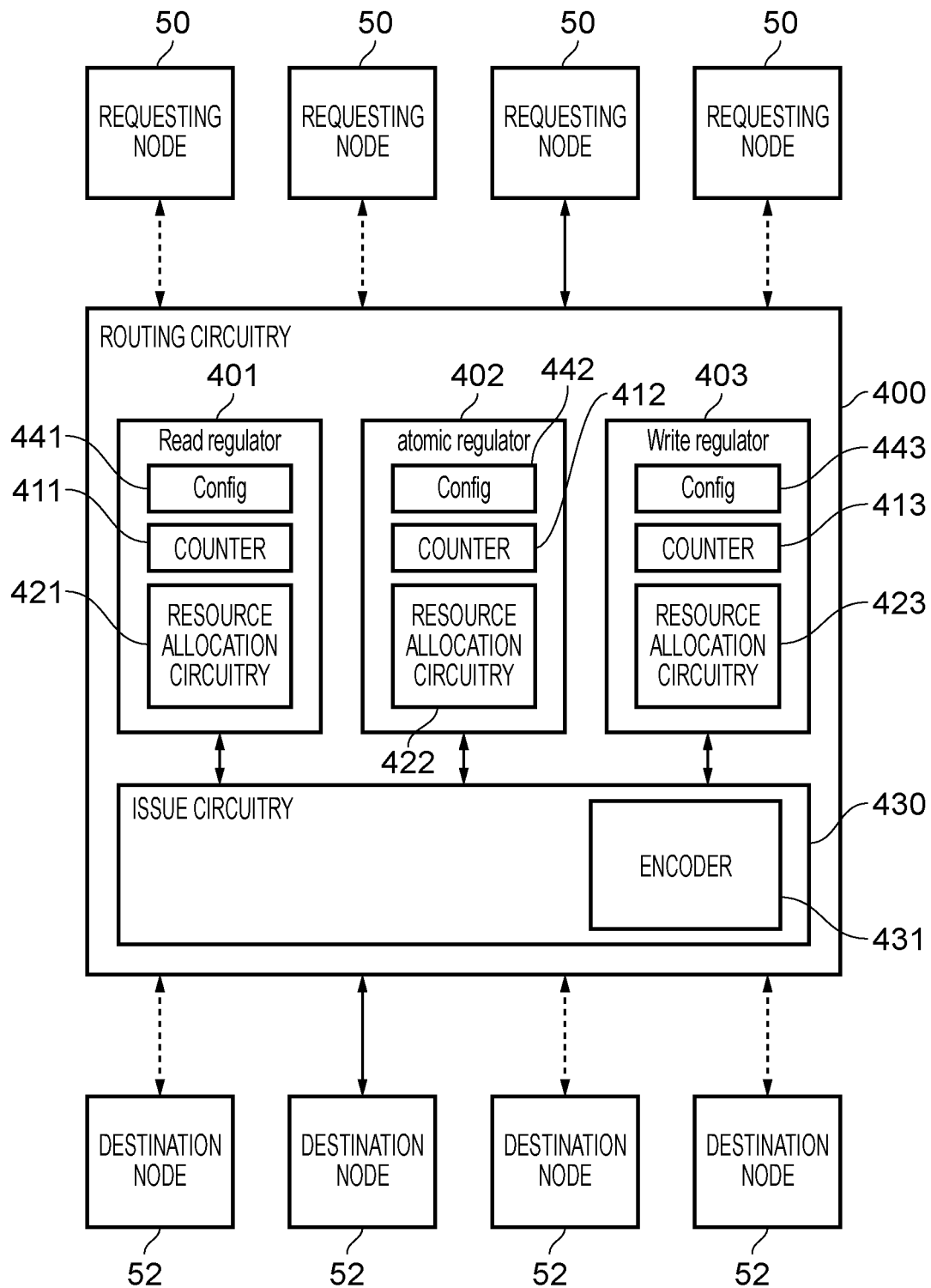
FIG. 4 shows an example of routing circuitry having respective request regulators for read, atomic and write data access requests and issue circuitry for issuing data access requests.

FIG. 4 shows a schematic illustration of routing circuitry 400 which may be provided within one of the interconnects 4, 6. For example, the routing circuitry 400 could be within one of the master interfaces 46 of the network on chip 6. Alternatively, the routing circuitry could be circuitry within the cache coherent interconnect 4 which controls which destination port of the interconnect a particular request is routed to. The routing control circuitry (routing circuitry) 400 is shown as handling requests from a plurality of requesting nodes 50 and directing the requests to a plurality of destination nodes 52. Typically, one particular requesting node 50 will request a transaction and the routing circuitry will direct the request to one particular destination node 52 selected from among the plurality of destination nodes 52. Each of the destination nodes 52 could be a system cache 38 within the interconnect or one of the downstream destinations 26 to 36 described in FIG. 1. The address specified by the request is used to select which destination is to service the request. When the request has been serviced by the destination node, a response is returned by the destination node 52 and the response is provided back to the requesting node 50. In this example, the routing circuitry 400 comprises a read request regulator 401, an atomic request regulator 402 and a write request regulator 403. The read request regulator 401 comprises a counter 411 (a read counter), at least one read configuration element 441 and resource allocation circuitry 421. The atomic request regulator 402 comprises a counter 412 (atomic counter), at least one atomic configuration element 442, and resource allocation circuitry 422. The write request regulator 403 comprises a counter 413 (write counter), at least one write configuration element 443, and resource allocation circuitry 423. In addition, the routing circuitry 400 comprises issue circuitry 430 which comprises an encoder 431. The issue circuitry is arranged to communicate with each of the read request regulator, the atomic request regulator, and the write request regulator in order to issue transaction requests received by each respective regulator, and to control the reception of transaction responses. When a transaction request is issued by the issue circuitry 430, the encoder 431 is arranged to encode the transaction request according to a protocol required by a network situated between the routing circuitry and the destination node. This encoding may include the encoding of the transaction identifier associated with each transaction request.

Figure 5:
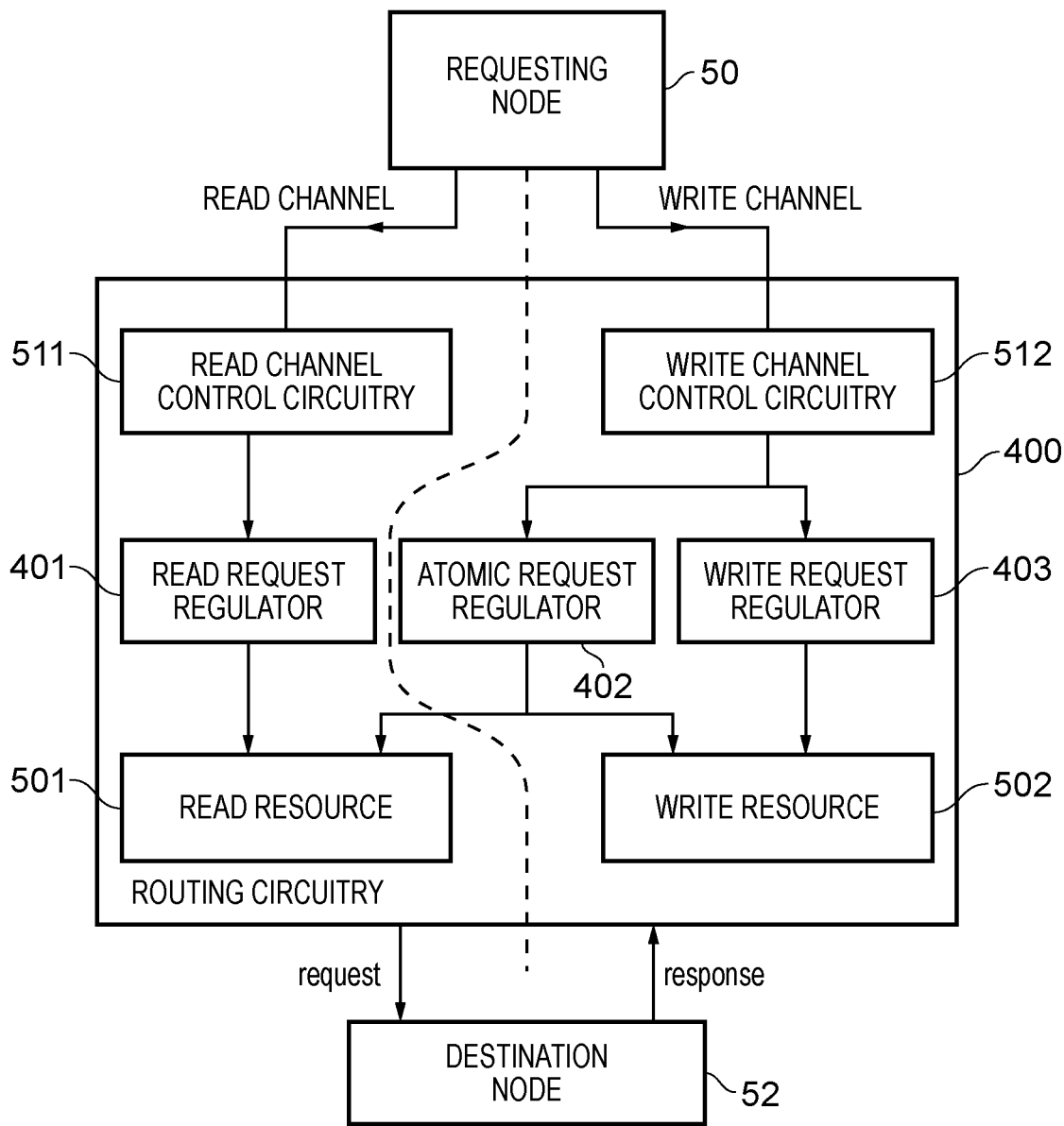
FIG. 5 shows an example of the routing circuitry and the management of read, write, and atomic data access requests on the read channel and write channel.

FIG. 5 shows the schematic illustration of routing circuitry 400 which may be provided within one of the interconnects 4, 6. In this illustration a requesting node 50 is shown which is arranged to provide transaction requests to the routing circuitry 400 using either a read channel or a write channel. As shown, the routing circuitry 400 comprises read channel control circuitry 511 and write channel control circuitry 512, as well as a read request regulator 401, an atomic request regulator 402 and a write request regulator 403. In addition the routing circuitry 400 is shown to include both a read resource 501 and a write resource 502. In this example the read channel control circuitry 511 is arranged to receive transaction requests from the requesting node 50 on a read channel and the read request regulator 401 controls the timing of the issue of the transaction requests, based upon a value of the read counter 411. If a transaction request detected by the routing circuitry 400 on the read channel is issued, the read resource 501 will be allocated to that transaction so that it cannot be used for other transactions. The resource may be a buffer slot, or credit for access to a downstream resource. The write channel control circuitry 512 is arranged to receive transaction requests from the requesting node 50 on a write channel. The write channel control circuitry is arranged to inform both the atomic request regulator 402 and the write request regulator 403 of the issued transaction request received on the write channel. For atomic requests received on the write channel, the transaction request is then issued based upon the value of the atomic counter 412 and the value of the write counter 413. Write requests are issued based on the value of the write counter 413 without regard for the value of the atomic counter. Accordingly, if a write request issued by the requesting node 50 and received on the write channel is issued, a portion of the write resource 502 (i.e. a buffer slot or credit for access to a downstream resource) comprised within the routing circuitry 400 is accordingly allocated to the transaction request so that it cannot be used for other transactions. As shown in FIG. 5 the destination node is arranged to receive transaction requests from the routing circuitry. These transaction requests are requests issued by the issue circuitry 430 and encoded by the encoder 431 which comprise a request for data from the destination node 52. In response to the transaction request issued by the issue circuitry 430 the destination node 52 is arranged to issue a response to the transaction request back to the routing circuitry 400 this response is received by the routing circuitry and the read resource 501 and the write resource 502 are decremented accordingly based on the transaction request type as indicated by the transaction identifier issued with the transaction response.

Figure 6:
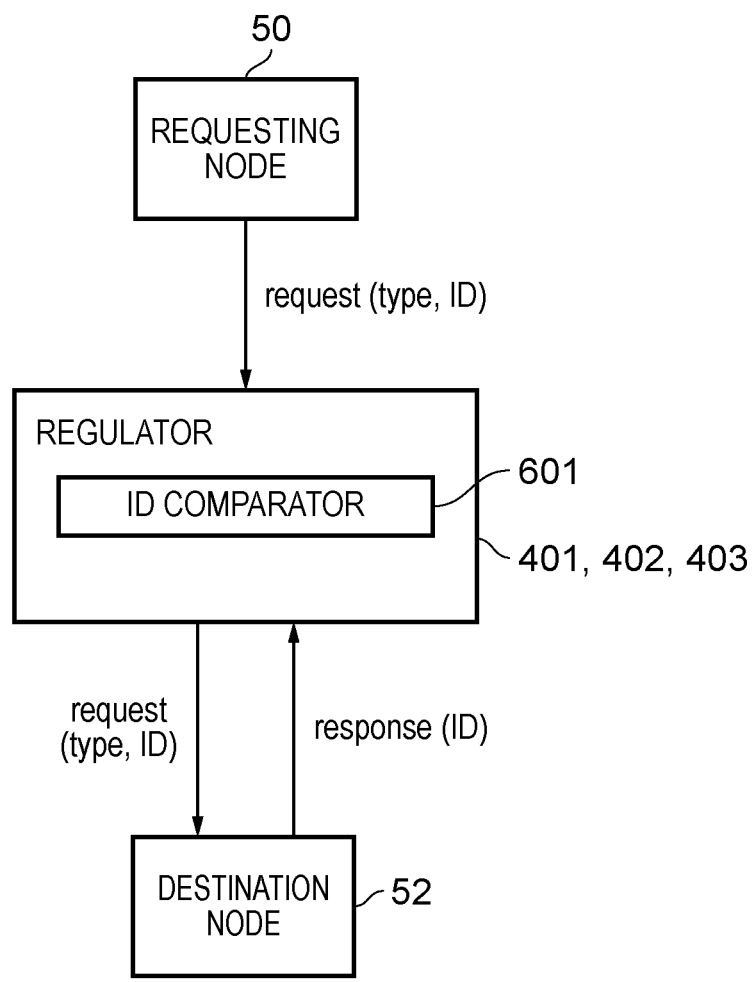
FIG. 6 shows the use of data access request identifiers as used by a regulator.

FIG. 6 illustrates a regulator 401, 402, 403 which comprises an ID comparator 601 (transaction identifier comparator). The regulator 401, 402, 403, is arranged to receive a transaction request from a requesting node 50 which includes an indication of both the type of the transaction request and a transaction identifier associated with the transaction request. The regulator is also arranged to issue transaction requests received from the requesting node 50 and to issue them to the destination node 52 along with an indication of the transaction identifier and the transaction type. The destination node is accordingly configured to issue a response to the transaction request wherein the response also includes an indication of the transaction identifier associated with the transaction request which is then received by the regulator 401, 402, 403 and is subsequently used to update the resource allocation circuitry 421, 422, 423 associated with the respective transaction request.

In some examples, the transaction identifier may be allocated to a pre-defined type of transaction request. For example, a portion of the identifier space available for issued transaction requests may be assigned to atomic requests. Accordingly, when an atomic transaction request is used by the regulator 401, 402, 403 the destination node may issue a read response to the atomic transaction request being serviced by the destination node 52, and the response may comprise a transaction identifier which identifies that the transaction response is a read response which corresponds to an atomic request. Accordingly, the resource allocation circuitry 422 of the atomic request regulator 402 may update the write resource based on the reception of an identified atomic response. This enables the atomic resource allocation circuitry to be updated, for example the atomic request counter may be decremented in response to receiving a read response which is associated with a transaction identifier in the ID space assigned to atomic requests. While there may also be separate ID space for read and write requests in addition to atomic requests, this is not necessary, since read and write responses are received on different channels, so it is possible to determine which type of response it is based on the channel it is received on. Hence, the remainder of the identifier space, other than the portion allocated to atomic requests, may be shared between read and write requests.

It will be appreciated that the use of an ID comparator to determine the type of transaction is just one example of how such a determination may be performed. In other examples, a different method may be used, such use of a tracker flag, a trace or a type field in the transaction response.

Figure 7:
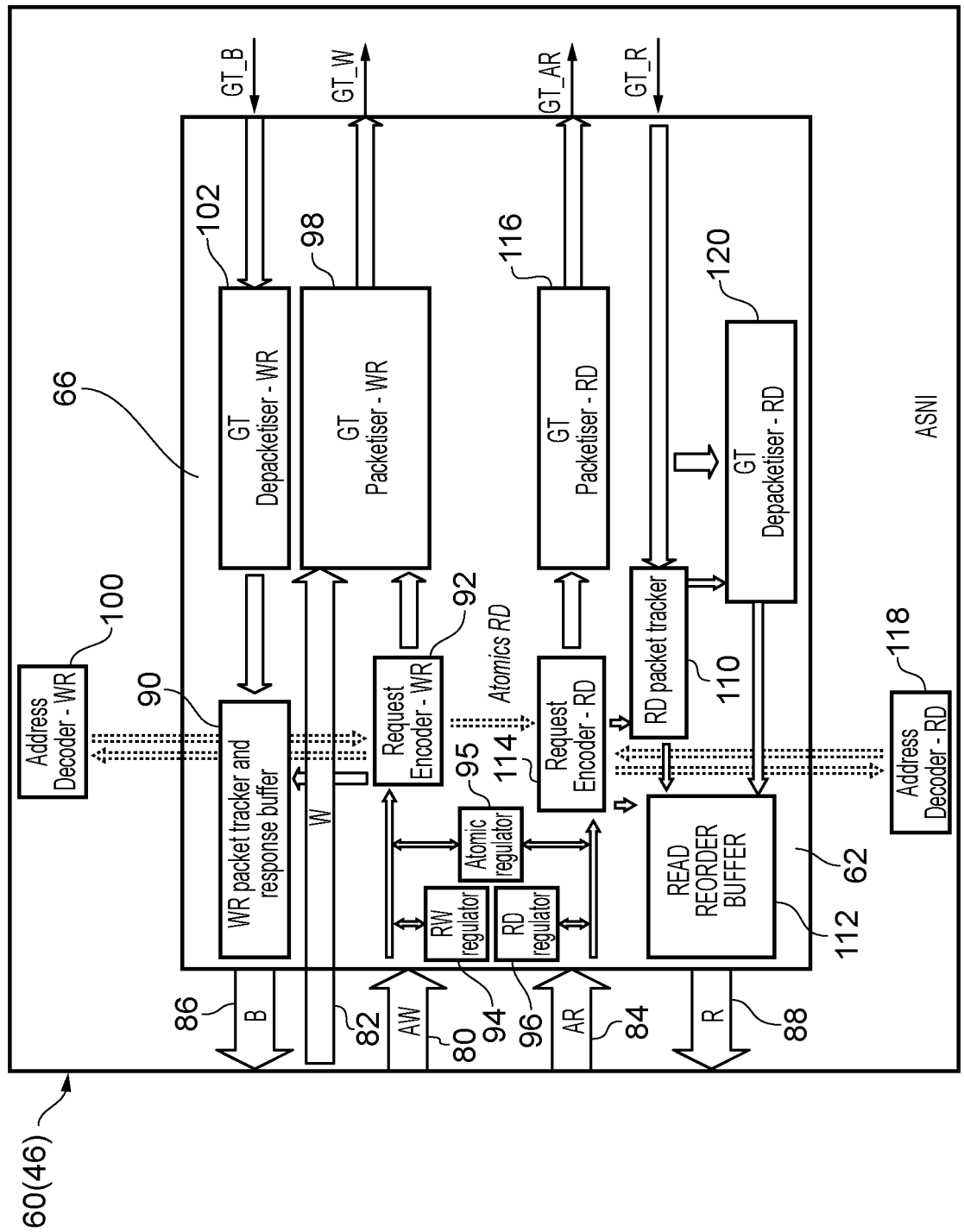
FIG. 7 shows an example of the routing circuitry in more detail.

FIG. 7 shows a more detailed example of the routing control circuitry 60 which in this example corresponds to one of the master interfaces 46 in the network on chip. The write channel control circuitry 66 is shown in the upper portion of the diagram and the read channel control circuitry 62 is shown in the lower portion. The signal path for communicating with the requesting node 50 includes a number of channels including a write request channel 80 (AW) for providing either a write request or an atomic request specifying the target address, a write data channel (W) 82 for providing the write data (or compare/swap data) for write/atomic requests, and a read request channel (AR) 84 for providing the address of a read request. The signal path also includes response channels, including a write response channel (B) 86 for providing the write response to the requesting node and the read response channel (R) 88 for providing the read response which provides the read data in response to a read request or an atomic request.

The write resource on the write channel includes a write request packet tracker/response buffer 90 which comprises a number of buffer entries or slots for storing tracking information for a corresponding write request or atomic request and buffering corresponding write responses. When a write or atomic request is received over the write channel a request encoder 92 allocates an entry in the write tracker/response buffer 90 for that request which specifies tracking information such as an identifier of the request. When a response is subsequently received from the destination node then it is allocated into the previously allocated slot of the write tracker/response buffer 90, which controls the order in which the responses are provided to the requesting node based on the tracking information. Transactions with the same identifier may be required to be handled in the order in which they are received from the requesting node without reordering. The tracker/buffer 90 may also specify additional information (e.g. trace-related tags) to be combined with write responses.

When the write request or atomic request is received on the write channel, the request encoder determines, based on signals provided by a write channel regulator 94 and the atomic regulator 95, whether that request is ready to be issued. In particular, a write request is issued in dependence on the write regulator 94, and an atomic request is issued in dependence on both the write regulator 94 and the atomic regulator 95. The regulator 94 may provide counters tracking the number of outstanding write requests or the number of requests issued in some time period. In addition, the regulator 95 may provide counters tracking the number of outstanding atomic requests or the number of atomic requests issued in some time period. The request encoder may also determine whether the write request or atomic request can be issued in dependence on whether there is spare resource in the packet tracker 90. If either the write regulator 94 indicates that the requesting node has already used its allowed allocation or there is no space in the packet tracker 90 then the write request can be stalled. In addition, if either the atomic regulator information indicates that the requesting node has already used its allowed allocation, or the write request regulator indicates that writes have used their allowed allocation, or there is no space in the packet tracker 90, or there is no space in the read buffers 110, 112 as described later (which are also needed for servicing atomic requests), then an atomic request can be stalled. If the write request or atomic request is ready to issue, the write request encoder 92 controls issuing of the request to downstream elements. In this example, as the network on chip 6 uses an internal transport protocol which is different to the data access protocol used by the request asserted by the requesting node, a data packetiser 98 is provided to translate the write request or the atomic request into the protocol used on the network on chip 6 and the request is output over the network on chip 6 to the selected destination node. As part of generation of the packet to be sent over to the network, an address decoder 100 determines, based on the target address specified over the write address channel 80, which destination interface is selected and generates routing information which is appended to the network packet to control routing through the appropriate sequence of routers 44 to reach the destination interface 48. When a write response is received from the destination node then a de-packetiser 102 interprets the packet and converts it back into a format appropriate for sending to the request node. The response may be placed in the buffer 90 and may be delayed in the buffer for some time if some reordering is required depending on the tracking information set when the request were received. It will be appreciated that the read response may be in multiple packets. This could be the case, for example, where the size of the channel is smaller than the size of the packet.

On the read side, the read channel control circuitry 62 comprises a number of resources for read requests which include a read packet tracker 110 for storing tracking information associated with received read requests and a read re-order buffer 112 which buffers the responses to read requests or atomic requests so that they can be re-ordered or assembled into a combined response. Again, issuing of the read requests may depend on a read regulator 96 which tracks a level of usage of bandwidth or other resources by read requests from the requesting node and may impose certain limits on the amount of bandwidth that can be used in order to help balance the relative share of interconnect bandwidth that can be used by different masters. The parameters within the write, atomic and read regulators 94, 95, 96 could be programmable by software executing on one of the masters. Also, control over whether a read request can be issued downstream is also dependent on there being space in one of the read resources such as the read packet tracker 110 or the read re-order buffer 112. The read packet tracker may specify tracking information including transaction identifiers which may be used for controlling ordering of transactions. Also the read packet tracker could specify additional information such as trace-related information which is not sent downstream for a read request but is instead stored within the packet tracker and then reassembled with the read response when the read response is returned to the requesting node.

Hence, when a read request is received on the address channel 84, the request encoder 114 on the read side determines whether the read regulator 96 permits issuing of the request and whether there is sufficient resource available for handling the read request in the buffers 110, 112. In addition, the request encoder 114 may determine whether the atomic regulator 95 permits issuing of the request. If so, it issues the read request to a read packetiser 116 which generates packets in the appropriate format for sending over the interconnect. When a request is issued space is allocated in the read packet tracker 110 or read re-order buffer 112. A read address decoder 118 decodes the address of the read request to identify the selected destination node to which the packets should be routed by the interconnect. In some cases the write and read address decoders 100, 118 could be the same decoder. When a read response is received in response to a read or an atomic request, the response is provided to the read de-packetiser 120 which interprets the received response packet and generates a response to be allocated to the read re-order buffer 112. The response is returned to the requesting node via signal path 88.

It will be appreciated that the routing control circuitry may also include some additional elements not shown in FIG. 7.

The regulators 94, 95, 96, for example, may comprise regulators 401, 402 and 403 which each comprise a respective configuration element 441, 442, 443 as shown in FIG. 4. These configuration elements 441, 442, 443 may be configured by a user (e.g. by software) in order to restrict the number of transactions of the corresponding type which may be issued. For example, the configuration elements may place a cap (for example, an upper limit) on the number of outstanding transactions of a particular type. Alternatively, the configuration elements may indicate a cap on a total amount of usage of a particular resource within a given time period (or total number of transactions of the relevant type issued in that period). For example, a time counter may count periods of a certain length of time, and if the number of requests of a given type issued since the time counter was last reset exceeds the threshold set for that time period, then no further requests of that type may be issued until the next time the time counter is reset. Since both write requests and atomic requests both use a shared write resource, an atomic configuration element and a write configuration element may be configured by a user in order to place a cap on the usage of the shared write resource by each type of transaction request, to prevent one type of transaction request from blocking issuing of the other type of transaction request.

Note that the thresholds set in the configuration elements 441, 442, 443 for the regulators may not only account for relative resource usage between competing types of requests received at one interface of the interconnect or network on chip, but may also be set to balance the interconnect/network bandwidth which can be used by particular master devices, so that for example the thresholds for one master device may be set lower than another master device which is to receive a higher share of bandwidth.

In interconnects which do not provide for protocol translation at the interfaces of the interconnect, the packetizing and depacketizing logic 98, 102, 116, 120 may not be required, and instead read or write requests could be forwarded in the same form as which they are received from the master device.

As atomic data access requests are received on the write channel but may require allocation of read resource, the write request encoder 92 may also trigger allocation of resource on the read side of the routing control circuitry. Hence, for one of the types of atomic requests which require both a read and a write response the request encoder 92 may allocate space both in the write packet tracker 90 and in the read packet tracker 110 or read re-order buffer 112. However, if all the space in the read buffers is already taken then this could block the atomic request which could then block other write requests on the write channel.

Figure 8:
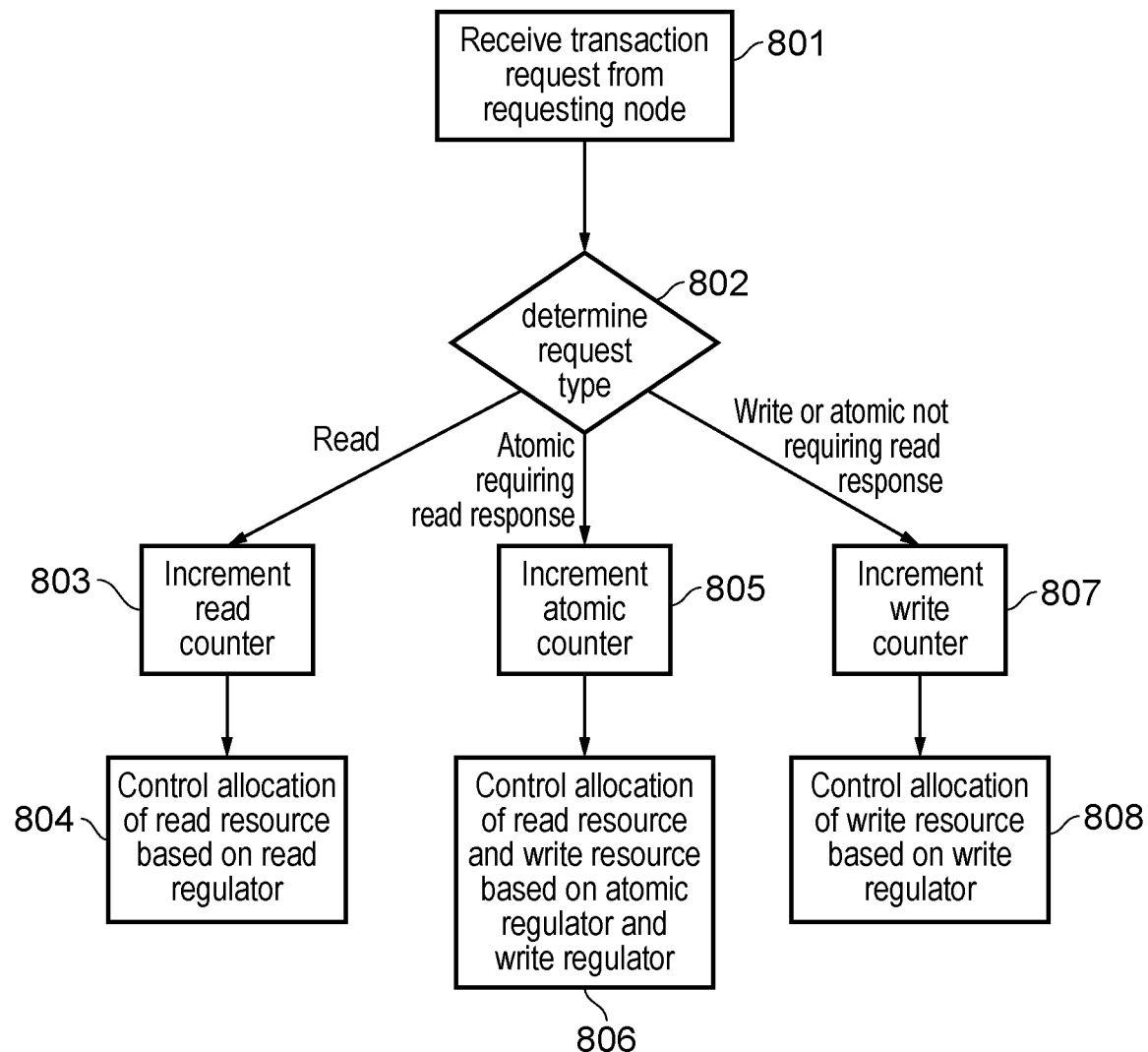
FIG. 8 is a flow diagram showing a method of controlling received transaction requests from a requesting node.

FIG. 8 shows a flow diagram showing a processing of transaction requests by the routing circuitry 400 such as an interconnect or network on chip. At step 801 a transaction request is received from a given requesting node 50. At step 802 the routing circuitry 400 is configured to determine the type of the transaction request that has been received.

If the request type is a read request then the routing circuitry is arranged to increment a read counter as shown at step 803 and to proceed at step 804 to control the allocation of the read resource based on a read regulator. If at step 802 it is determined that the received transaction request type is an atomic request which requires a read response, then the routing circuitry 400 is arranged, at step 805 to increment the atomic counter, and to proceed to control the allocation of a read resource and a write resource based on the atomic regulator and write regulator at step 806. If at step 802 it is determined that the received transaction request is a write transaction request (or an atomic request which does not require a read response), then the routing circuitry 400 is arranged to increment the write counter at step 807 and to proceed to control the allocation of the write resource based on the write regulator as illustrated at step 808.

Figure 9:
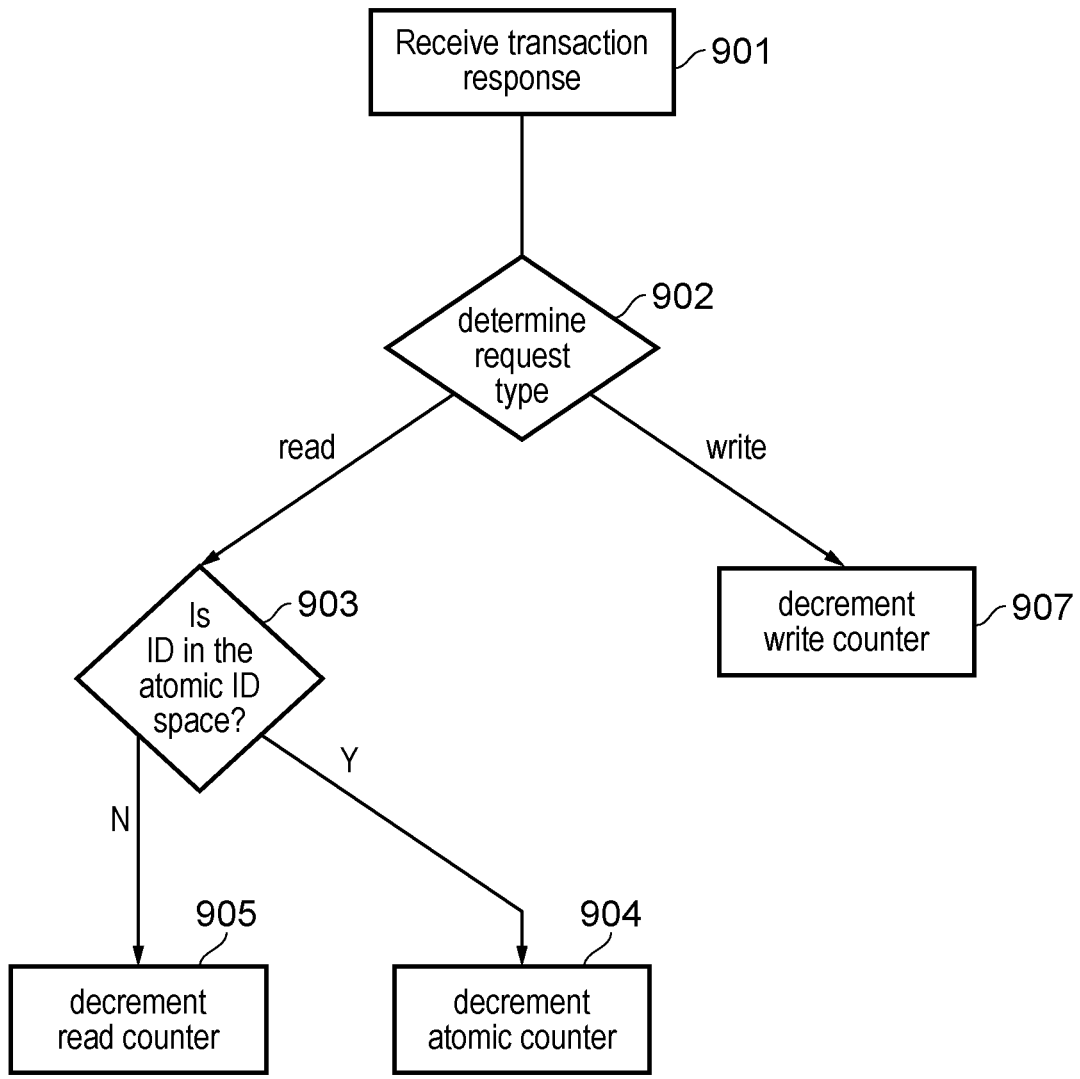
FIG. 9 is a flow diagram showing a method of controlling the reception of transaction responses.

FIG. 9 shows a flow diagram showing processing of responses to transaction requests by routing circuitry 400 such as an interconnect or network on chip. At step 901 a transaction response is received from a given destination node 52, and at step 902 the transaction type of the received transaction response is determined. If the response type of the transaction response is determined to be a read response, the transaction identifier of the read response is determined at step 903 as to whether it is an ID (transaction identifier) in the atomic transaction identifier space (the atomic ID space). If the transaction identifier of the read response is in the atomic ID space the atomic counter is decremented at step 904, whereas if the transaction identifier of the read response is not in the atomic ID space the read counter is decremented at step 905. If, at step 902 the transaction response type is determined to be a write response, the write counter is decremented at step 907.

In other examples, step 903 may determine whether the read response is a response to a read request or a response to an atomic request in other ways, not based on the transaction ID. For example, when the read/atomic request was received, the transaction ID of that request could be tagged in the read packet tracker 110 with a flag indicating whether the request was a read request or an atomic request, and then when a read response is received, the read packet tracker 110 can determine from the flag associated with the transaction ID specified by that read response whether the atomic counter in the atomic regulator 95 or the read counter in the read regulator 96 should be decremented. This approach has the advantage that neither the circuitry upstream from the routing circuitry 60 (e.g. at the requesting node), nor the circuitry downstream from the routing circuitry 60 (e.g. at the destination node) needs any modification to enable read responses from read and atomic requests to be distinguished, as there is no need for the upstream circuitry to reserve any transaction IDs for atomic requests only, or for the downstream circuitry to include any information in the read response specifying what type of request triggered that response.

In some implementations the present technique may be implemented in a physical integrated circuit manufactured to have the interconnect or other form of data access routing circuitry discussed above.

However, the present technique may also be embodied in an integrated circuit design file which provides an electronic design representation of components of an integrated circuit to be manufactured. For example, the electronic design file may specify, e.g. using RTL or some other circuit representation language, the components of the interconnect to be provided, which can then be used by a downstream party to control the manufacture of the integrated circuit. For example, the design file could specify the low level transistor or gate level layouts of the interconnect, or could specify the components of the interconnect at a higher level such as using blocks or standard cells to identify the placement of certain standard components so that the low level transistor or gate level representation can later be looked up from a library of standard components in order to identify the final integrated circuit layout. Hence, in some embodiments the electronic design file representing the integrated circuit design may include a definition of some components which comprise data access routing circuitry to manage allocation of resource for handling read, write and atomic requests and to reserve resource for atomic request which cannot be used by reads.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. An apparatus comprising:
routing circuitry to route transaction requests from a requesting node to a destination node;
issue circuitry to control issuing of a transaction request received from the requesting node to the destination node in dependence on resource usage monitoring performed by a plurality of request regulation circuitry;
the plurality of request regulation circuitry comprising:
a read request regulation circuitry to monitor resource usage by read requests requiring a read response;
a write request regulation circuitry to monitor resource usage by write requests requiring a write response; and
an atomic request regulation circuitry to monitor resource usage by at least one type of atomic request requiring both the write response and the read response,
wherein the issue circuitry is configured to control issuing of the at least one type of atomic request in dependence on both the resource usage monitored by the write request regulation circuitry and the resource usage monitored by the atomic request regulation circuitry.

2. The apparatus according to claim 1, wherein the read request regulation circuitry comprises at least one read configuration element including at least one read resource restriction restricting resource usage by read requests.

3. The apparatus according to claim 1, wherein the write request regulation circuitry comprises at least one write configuration element including at least one resource restriction restricting resource usage by write requests.

4. The apparatus according to claim 1, wherein the atomic request regulation circuitry comprises at least one atomic configuration element including at least one atomic resource restriction restricting resource usage by the at least one type of atomic request.

5. The apparatus according to claim 4, wherein the atomic configuration element is separate from a write configuration element of the write request regulation circuitry, the write configuration element including at least one resource restriction restricting resource usage by write requests.

6. The apparatus according to claim 1, wherein the routing circuitry comprises at least one shared resource for handling read responses which is shared for use by both read requests and the at least one type of atomic request.

7. The apparatus according to claim 1, wherein the routing circuitry comprises:
read channel control circuitry to manage allocation of resources for read requests received on a read request channel; and
write channel control circuitry to manage allocation of resources for write requests and the at least one type of atomic request received on the write request channel.

8. The apparatus according to claim 1, wherein the routing circuitry is configured to determine which read responses or write responses are associated with each transaction request depending on a transaction identifier specified by each transaction request and a corresponding transaction identifier specified by each read response or write response.

9. The apparatus according to claim 8, wherein in response to receipt of a read request or the at least one type of atomic request, the routing circuitry is configured to store a tracking indication in association with the transaction identifier of the received request, the tracking indication specifying whether the received request is a read request or is said at least one type of atomic request; and
in response to receipt of a read response, the routing circuitry is configured to determine, based on the tracking indication stored in association with the transaction identifier specified by the read response, whether the read response is a response to a read request or a response to the at least one type of atomic request.

10. The apparatus according to claim 8, wherein the atomic request regulation circuitry and the read request regulation circuitry are configured to determine, based upon the transaction identifier associated with a given read response, whether the given read response is associated with a read request or with the at least one type of atomic request.

11. The apparatus according to claim 8, wherein the atomic request regulation circuitry and the write request regulation circuitry are configured to determine, based upon the transaction identifier associated with a given write response, whether the given write response is associated with a write request or with the at least one type of atomic request.

12. The apparatus according to claim 1, wherein the read request regulation circuitry comprises a read request counter.

13. The apparatus according to claim 12, wherein the read request regulation circuitry is configured to increment the read request counter when a read request is received or issued by the issue circuitry, and to decrement the read request counter when a read response is identified by the read request regulation circuitry indicating that an issued read request has been serviced.

14. The apparatus according to claim 1, wherein the write request regulation circuitry comprises a write request counter.

15. The apparatus according to claim 14, wherein the write request regulation circuitry is configured to increment the write request counter when a write request is received or issued by the issue circuitry, and to decrement the write request counter when a write response is identified by the write request regulation circuitry indicating that an issued write request has been serviced.

16. The apparatus according to claim 1, wherein the atomic request regulation circuitry comprises an atomic request counter.

17. The apparatus according to claim 16, wherein the atomic request regulation circuitry is configured to increment the atomic request counter when the at least one type of atomic request is received or issued by the issue circuitry, and to decrement the atomic request counter when the read response is received in response to an issued atomic request of the at least one type.

18. The apparatus according to claim 1, wherein the at least one type of atomic data access request comprises at least one of:
an atomic swap request specifying a target address and a further operand, for triggering the destination node to return the read response providing data read from a target storage location and to return the write response confirming servicing of an unconditional write operation for writing the further operand to the target storage location;
an atomic compare-and-swap request specifying a target address, a swap operand, and a compare operand, for triggering the destination node to return the read response dependent on data read from the target storage location, and to return the write response confirming servicing of a conditional write operation for conditionally writing the swap operand to the target storage location, conditional on a comparison between the data read from the target storage location and the compare operand; and
an atomic load request specifying the target address and an additional operand, for triggering the destination node to return the read response dependent on the data read from the target storage location, and to return the write response confirming servicing of a conditional or unconditional write operation to write a result value to the target storage location, the result value comprising a result of an arithmetic or logical operation applied to the additional operand and the data read from the target storage location.

19. A method for muting transaction requests in a data processing system, comprising the steps of:
- routing transaction requests from a requesting node to a destination node;
- monitoring resource usage by read requests requiring a read response using a read request regulation circuitry;
- monitoring resource usage by write requests requiring a write response using a write request regulation circuitry;
- monitoring resource usage by at least one type of atomic request requiring both the write response and the read response using an atomic request regulation circuitry;
- controlling issuing of transaction requests received from the requesting node to the destination node in dependence on resource usage monitoring performed by a plurality of request regulation circuitry including the read request regulation circuitry, the write request regulation circuitry and the atomic request regulation circuitry; and
- controlling issuing of the at least one type of atomic request in dependence on both the resource usage monitored by the write request regulation circuitry and the resource usage monitored by the atomic request regulation circuitry.

20. A non-transitory computer storage medium storing an electronic design file providing a representation of the apparatus according to claim 1.

* * * * *